(12) United States Patent
Sundelin et al.

(10) Patent No.: US 10,921,463 B1
(45) Date of Patent: Feb. 16, 2021

(54) SYSTEMS AND METHODS FOR VEHICLE ORIENTATION DETERMINATION

(71) Applicant: Christopher Davis Williams, Charlottesville, VA (US)

(72) Inventors: Ronald M. Sundelin, Yorktown, VA (US); Christopher Davis Williams, Charlottesville, VA (US)

(73) Assignee: Christopher Davis Williams, Charlottesville, VA (US)

( * ) Notice: Subject to any disclaimer, the term of this patent is extended or adjusted under 35 U.S.C. 154(b) by 0 days.

(21) Appl. No.: 16/892,150

(22) Filed: Jun. 3, 2020

Related U.S. Application Data (60) Provisional application No. 62/921,241, filed on Jun. 5, 2019.

(51) Int. Cl.
  *G01S 19/53* (2010.01)
  *G01S 19/31* (2010.01)
(52) U.S. Cl.
  CPC .............. *G01S 19/53* (2013.01); *G01S 19/31* (2013.01)
(58) Field of Classification Search
  CPC .......... G01S 19/53; G01S 19/31; G01S 19/36; G01S 19/54; G01S 19/14; G01S 19/39
  USPC .................................................... 342/357.36
  See application file for complete search history.

(56) References Cited

U.S. PATENT DOCUMENTS

| | | | |
|---|---|---|---|
| 2007/0299608 A1* | 12/2007 | Ishihara | G01S 19/20 701/469 |
| 2010/0060990 A1* | 3/2010 | Wertheim | G02B 27/01 359/632 |
| 2015/0019266 A1 | 1/2015 | Stempora et al. | |
| 2015/0022380 A1 | 1/2015 | Conner et al. | |
| 2015/0100184 A1* | 4/2015 | Nathan | G01P 5/175 701/7 |
| 2015/0254781 A1 | 9/2015 | Binion et al. | |
| 2015/0321094 A1 | 11/2015 | Wei et al. | |
| 2016/0052626 A1 | 2/2016 | Vander Mey | |
| 2016/0236794 A1 | 8/2016 | Tucker et al. | |
| 2017/0147006 A1* | 5/2017 | Yang | G05D 1/10 |
| 2017/0151490 A1 | 6/2017 | Doerksen et al. | |
| 2019/0156684 A1* | 5/2019 | Pohl | G05D 1/101 |
| 2019/0219399 A1* | 7/2019 | Noguchi | G07B 15/06 |

OTHER PUBLICATIONS

International Search Report and Written Opinion dated Oct. 9, 2020 issued in application serial No. PCT/US2020/036135.
Tuermer "Airborne Vehicle Detection in Dense Urban Areas Using HoG Features and Disparity Maps", IEEE Journal, Dec. 2013, retrieved on Sep. 21, 2020.

* cited by examiner

*Primary Examiner* — Harry K Liu
(74) *Attorney, Agent, or Firm* — Hogan Lovells US LLP (57) ABSTRACT

Systems and methods are directed toward determining a vehicle orientation based on sensor information. Sensors are positioned along a vehicle body that may be evaluated to determine corresponding values between matching sensor types. When a threshold of sensors having corresponding values is met, the information from those sensors is combined with additional sensor information to determine a vehicle orientation. As a result, faulty sensor information may be disregarded without eliminating information from operational sensors.

20 Claims, 6 Drawing Sheets

SYSTEMS AND METHODS FOR VEHICLE ORIENTATION DETERMINATION

CROSS REFERENCE TO RELATED APPLICATIONS

This application claims priority to and the benefit of U.S. Provisional Application Ser. No. 62/921,241 filed Jun. 5, 2019 titled "VEHICLE ORIENTATION DETERMINATION SYSTEM," the full disclosure of which is hereby incorporated herein by reference in its entirety for all purposes.

BACKGROUND

The rate of climb of an aircraft is governed by the attitude of the aircraft relative to its direction of travel through the atmosphere. The angle between the attitude and direction of travel is known as the angle-of-attack (AOA). The rate of climb of the aircraft increases with increasing AOA up to a limit, above which the airflow pattern is changed and the force lifting the aircraft abruptly decreases. As a result, AOA information is utilized to provide safe operation of the aircraft. A commonly used method for measuring the AOA comprises a protuberance, usually several inches long, extending outward from the fuselage of the aircraft. The air moving past the fuselage exerts a force on this protuberance. The direction of this force is sensed and used, together with other information about the specific aircraft configuration, to determine the AOA. These sensors can be damaged, for example by collisions with birds or during cleaning operations, thereby reducing information utilized for operation of the aircraft.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present disclosure are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Moreover, like reference numerals may be used for like items throughout the specification, however, such usage is for convenience and is not intended to limit the scope of the present disclosure.

Embodiments of the present disclosure are directed toward systems and methods for determining the angle-of-attack (AOA) of an aircraft and/or for providing position orientation information for a variety of vehicles, such as ships, trains, cars, and the like. Various embodiments of the present disclosure include providing control logic to evaluate a reading obtained from a plurality of sensors. These sensors receive information that is evaluated against other sensors to determine whether readings are within a certain threshold of one another, thereby verifying their accuracy. If a threshold number of different sensor readings provide information that substantially correlate to each other, then information from the sensors may be deemed reliable and utilized to calculate the AOA. Embodiments may provide redundancies and increase a number of sensors utilized in order to reduce a likelihood that sensor damage or erroneous values leads to deactivation of various systems.

Embodiments of the present disclosure may also utilize global positioning systems (GPS) to analyze a relative position of a sensor relative to another sensor. A trailing time between the two sensors may be determined, for example where the sensors are arranged along a common axis that is not tilted. Thereafter, a difference in that trailing time may be utilized to determine a tilt or sway of the axis, which may correspond to a tilt or sway of the vehicle.

Various embodiments of the present disclosure may include a guard or protective structure to prevent organic material, such as a bird carcass, from striking and damaging one or more sensors. The guard may be particularly selected to reduce turbulence upstream of the sensors while also effectively moving pieces of the organic material away from the sensor.

It should be appreciated that systems and methods described herein include a system for determining the angle-of-attack of an aircraft comprising, in combination, an aircraft, a plurality of sensors, and means for processing the output of the sensors to obtain reliability and availability higher by more than a factor of ten than is available using two sensors of the existing type. The system may, in various embodiments, use three or more sensors, which sensors are located in positions where not more than one is likely to be damaged at a time, and circuitry which permits accurate angle-of-attack information to continue to be obtained if two sensors are undamaged. Furthermore, the system may include means providing information on the orientation of the aircraft relative to the horizontal, means providing information on the airspeed of the aircraft, and means providing information on the vertical velocity of the aircraft, and means for combining this information to determine the angle-of-attack. The system may also incorporate, in combination with or in place of the other sensors, a plurality of GPS sensors, a first of which is positioned near the front of the aircraft and a second of which is positioned near the rear of the aircraft, which sensors have circuitry interconnected by high speed and stable communication means, means for obtaining accurate information of the orientation of the aircraft relative to the horizontal using the GPS receivers, means for determining the airspeed of the aircraft, means for determining the vertical speed of the aircraft relative to the ground, and means for combining this information to determine the angle of attack. As noted above, systems and methods of the present disclosure may be utilized with a variety of vehicle types. For example, in combination, a system may include a vehicle, a first GPS receiver mounted near the left side of the vehicle, a second GPS receiver mounted near the right side of the vehicle, high speed and stable means for comparing the two signals to obtain a high accuracy relative position, and means for making information on the altitude differences of the two sensors accessible. The system may also include a vehicle supported on a roadbed, a plurality of GPS sensors mounted on the vehicle, receivers for converting the information from the sensors into time information, high speed and stable transmission means, means for comparing the receiver time information and obtaining accurate position information, and means for using the GPS receivers to identify the locations at which significant deviations from normal signals are detected. Furthermore, the system may include, in combination, a second vehicle, coupled to the first, with at least one GPS sensor mounted on the second vehicle and linked to the first by stable high speed communication means, and means using the sensors to detect side-to-side and up-and-down motion of the two vehicles relative to each other, in addition to the side-to-side tilt information available with a single vehicle.

Embodiments of the present disclosure may also include a process of discontinuing use of an existing AOA determination system using two AOA sensors, which has a predictable failure frequency due to bird strikes of at least one-hundred times a reference frequency, corresponding to an acceptable rate of event occurrence over time, the adding of at least one AOA sensor located on the aircraft so that a bird striking one AOA sensor will not simultaneously strike a second one, the adding of a system to process the AOA sensor outputs and generate an output from at least two of which are in substantial agreement, creating a measurement system with a predictable bird strike failure rate less than the reference frequency, means for identifying the position of a damaged AOA sensor, and specifying in instructions provided to aircraft purchasers the replacement of any damaged AOA sensor at the earliest practical opportunity. The system may be configured such that the number of AOA sensors is increased to at least four. Moreover, the process may also be used where the discontinued system is capable of affecting the aircraft's flight controls without pilot intervention. Embodiments may also be directed toward an aircraft comprising, in combination, at least three AOA sensors, at least one of which is placed at least thirty-five degrees below the horizontal mid-plane of the fuselage. Furthermore, embodiments may include a deflector installed in front of an AOA sensor, which deflector is designed to prevent remains of a bird striking it from striking the AOA, avoid creating turbulence, which would prevent the AOA sensor from providing reliable information, and avoid unnecessarily adding to the aircrafts drag coefficient.

Figure 1:
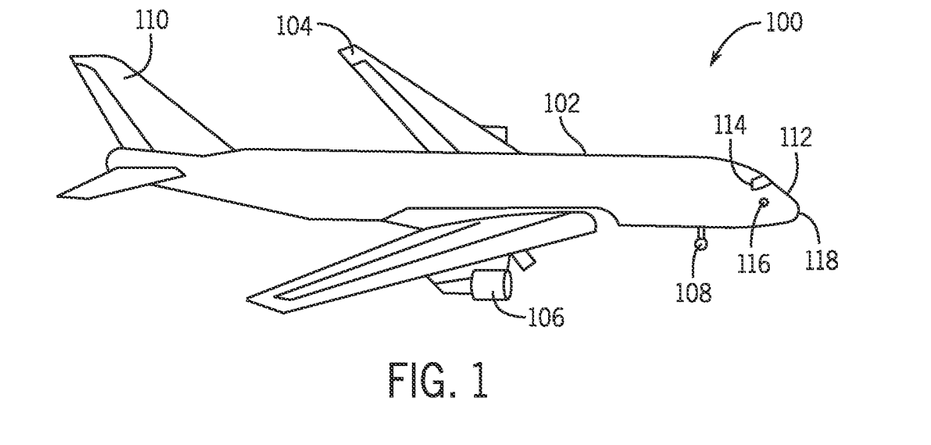
FIG. 1 is a schematic side view of an embodiment of an aircraft that may be equipped with sensors, in accordance with embodiments of the present disclosure.

FIG. 1 is a perspective view of an embodiment of an aircraft 100. The illustrated aircraft 100 includes a fuselage 102, wings 104, engines 106 mounted to the wings 104, wheels 108, and a tail 110. It should be appreciated that various rudder and flap systems may also be incorporated into the aircraft, for example into the tail 110 or wings 104, but that such systems have not been included for simplicity with the present discussion.

The illustrated aircraft 100 includes a conical nose 112 that is positioned forward of a window associated with a cockpit 114. In various embodiments, traditional angle-of-attack (AOA) sensors may be arranged proximate the nose 112 and/or along the fuselage 102. As previously noted, at least because of their size and arrangement to extend away from the aircraft body, traditional AOA sensors may be subject to damage from a variety of factors, including but not limited to, bird strikes, cleaning operations, maintenance operations, and the like. For example, birds may strike the aircraft 100 during flight. Moreover, the extending AOA sensors may be damaged during maintenance operations as personnel are walking adjacent to areas of the fuselage. Such damage may negatively affect performance of the aircraft 100.

The illustrated embodiments includes an AOA sensor 116, which may also be referred to as an airflow direction sensor, positioned at a front 118, substantially cylindrical part of the fuselage 102. The AOA sensor 116 is arranged to measure a direction of airflow past the AOA sensor. In certain embodiments, the AOA sensor 116 may be combined or associated with other sensors, such as pitot tubes, which may measure a velocity but not direction of airflow. It should be appreciated that a second AOA sensor 116 may be arranged at an opposite side of the front 118 (not pictured) and that information from each of the sensors 116 may be utilized in order to determine the angle of attack.

Various control and instrumentation systems use data from both of the two AOA sensors 116, one of which is on each side of the aircraft 100, to provide information on the AOA in agreement with each other within a specified level of accuracy. If the two sensors provide information which differs by more than this level, the measurement system is disabled and provides no information known to be accurate.

In other words, an error associated with one of the sensors 116 may trigger a system that disables utilizing information from either of the sensors 116. If the AOA sensors were completely reliable, there would be negligible likelihood that the system would be rendered inoperative. However, bird strikes are a relatively common occurrence that damages the AOA sensors 116. There are over 13,000 civilian aircraft bird strikes in the United States annually, and it is estimated that only 20 percent of bird strikes are reported. This yields an actual count of approximately 65,000 bird strikes per year. While this number may be higher or lower, embodiments of the present disclosure may be incorporated to solve the problem associated with unreliable AOA readings from traditional sensor arrangements.

There are approximately 3,000 scheduled commercial flights in the air over the United States at any one time, except in the middle of the night. If 18 hours per day are used as a flying period for 365 days a year, there are 19.71 million flight hours per year. This, in turn, leads to one bird strike per 303 hours per aircraft. For a given commercial aircraft, including fuselage, wings, and tail, a front cross-section is approximately 300 square feet. A bird strike within six inches of an AOA sensor, depending on bird size and speed of the airplane relative to the bird, is likely to damage the sensor. This represents an area of 0.79 square feet. The expected number of flight hours per AOA sensor is therefore the average period multiplied by the area ratio, or 303×300/0.79=115,000 flight hours as the average time between occurrences of bird strike damage to an AOA sensor, and half that or 57,500 hours for a two-sensor system.

If a commercial pilot is airborne 25,000 hours during a flying career, the pilot has less than a fifty percent chance of ever having an AOA determination system disabled. If such a disablement does occur, however, even if the pilot has been instructed on the appropriate way to deal with the situation, it is likely to take the pilot an undesirably long time to determine the appropriate response. This is particularly true if the actual AOA is changing during this time period. It is even more true if the AOA system is being used to modify the flight controls of the aircraft without pilot intervention. The Federal Aviation Administration (FAA) requires that the minimum expected number of flight hours between catastrophic failures is one billion. Although an AOA system disablement will not necessarily lead to a catastrophic failure, it should be noted that the expected AOA disablement rate is more than 17,000 times the maximum allowed catastrophic rate.

Embodiments of the present disclosure describe systems and methods for vehicle orientation determination that may lower the AOA determination system failure rate to an estimated 0.57 failures per billion flight hours, which is a rate lower that the catastrophic failure rate permitted by the FAA. The invention further discloses a process for lowering the AOA determination system failure rate due to bird strikes to an estimated 16 per quadrillion flight hours.

Embodiments of the present disclosure may include removal or bypass of the existing AOA determination systems utilized in conventional aircrafts, or new installation configured to operate using the present embodiments, and may include mounting additional sensors to the fuselage 102, thereby reducing the likelihood that a threshold number of sensors are damaged. By way of example only, a third sensor may be mounted to the fuselage 102 such that damage to one of the three sensors still maintains information from at least two other sensors. However, it should be appreciated that three sensors is provided by example only and that, in various other embodiments, any number of sensors and any threshold number of sensors may be established. Furthermore, the additional sensors may be mounted such that damage to one sensor, such as a bird strike, will not also damage another sensor. In other words, the sensors may be mounted a threshold distance away from one another to reduce the likelihood that a single collision with a bird damages more than one sensor.

Figure 2:
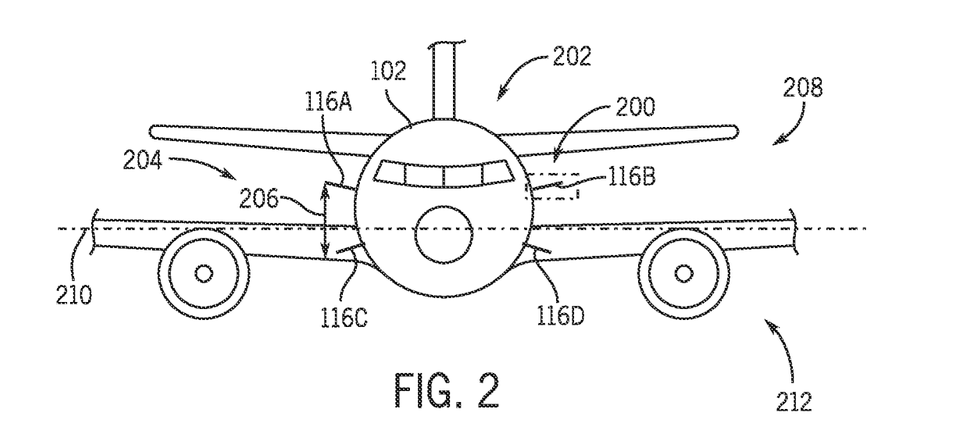
FIG. 2 is a schematic front view of an embodiment of an aircraft including angle-of-attack (AOA) sensors, in accordance with embodiments of the present disclosure.

FIG. 2 is a front view of an embodiment of the aircraft 100 illustrating the fuselage 102. It should be appreciated that various features have been removed for clarity with the present discussion. The illustrated embodiment includes a plurality of AOA sensors 116, each protruding radially outward from the fuselage 102. As noted above, each of these sensors 116 may have a representative area 200 corresponding to a region where impact with an object, such as a bird or a like, may damage the sensor 116. Moreover, while discussions herein may describe in-air collisions with birds, a variety of other situations may lead to damage to the sensors 116, such as during maintenance operations and the like.

In this embodiment, there are four sensors 116, each being designated with a corresponding letter for clarity. In this embodiment, there are two sensors 116A, 116C on a first side 202 of the fuselage 102 and two sensors 116B, 116D on a second side 204 of the fuselage 104. Each of the sensors 116 is positioned a distance 206 away from the other sensor 116 on the same side 202, 204. That is, the sensor 116A is the distance 206 from the sensor 116C. In various embodiments, the distance 206 may correspond a length along an outer circumference of the fuselage 102. However, it should be appreciated that the distance 206 may also include a different axial position along the fuselage (e.g., the sensors 116 may not be aligned). It should be appreciated that the distance 206 may be particularly selected to avoid a scenario where an impact to one of the sensors 116 on each side 202, 204 would also affect the other sensor 116 on the same side 202, 204.

In the illustrated embodiment, half of the sensors 116 are arranged in an upper region 208 above a mid-line 210, and the other half are in a lower region 212 below the midline 210. Locations of the sensors 116 may be particularly selected to anticipate areas with a lower likelihood of impact from birds or maintenance operations and/or based on the position of other sensors 116. In the illustrated embodiment, the sensors 116C, 116D are positioned approximately thirty-five degrees below midline 210. However, this position is for example purposes only and it should be appreciated that sensors 116 may be arranged at the midline, above, the midline, or below the midline. Moreover, the sensors 116 may be approximately 10 degrees above or below the midline, approximately 20 degrees above or below the midline, approximately 30 degrees above or below the midline, approximately 40 degrees above or below the midline, approximately 50 degrees above or below the midline, or any other reasonable location. In various embodiments, the position of the sensors 116 is particularly selected to reduce or minimize damage during maintenance.

In this example that includes the four sensors 116A-116D, information may be acquired from each of the four sensors 116A-116, where processing rules may evaluate the information to determine a difference or correspondence within a predetermined threshold. As long as a certain number of sensors (e.g., a threshold of sensors), is within the predetermined threshold indicating correspondence, a confidence that the information provided by the sensors is accurate increases. In various embodiments, the threshold of sensors may be less than the total number of sensors, thereby providing leeway for damage or errors. For example, the threshold of sensors may be three sensors in this embodiment. Additionally, the threshold of sensors may be two sensors. Furthermore, in various embodiments, the threshold may also correspond to a location of the sensors. By way of example, at least one sensor on opposite sides of the aircraft may be sufficient or at least one sensor in a different upper/lower region may be sufficient.

Accordingly, the limited reliability of existing angle of attack sensors may be improved by embodiments of the present disclosure. For example, a single sensor 116A may give erroneous data with no indication that it is erroneous, which can lead to disastrous consequences. Use of only two such sensors 116A, 116B, as is currently the practice, can identify a malfunctioning sensor and permit the system to shut down when it occurs. However, using such a system could potentially lead to providing no information at all. Systems and methods of the present disclosure overcome this problem by using additional sensors, such as three or four sensors, spaced so that a single bird strike will not disable more than one sensor, and use the results from any two of them (or any other threshold number) that agree with each other. For even greater reliability, a fourth one can be added, as shown in FIG. 2, with the output based on three in agreement, the fourth providing a warning signal when it disagrees, or on two in agreement. Providing at least one additional sensor, and the associated control logic associated with the acquired data, makes many orders of magnitude improvement, and is thus a surprising and unexpected result.

As noted above, the four sensors are shown for illustrative purposes and more or fewer sensors may be utilized. For example, there may be 3 sensors, 5 sensors, 6, sensors, 7 sensors, or any reasonable number of sensors. Moreover, there may be more sensors on one side 202, 204 than the other. Furthermore, the sensors may be positioned at different circumferential positions such that the sensors are not symmetrical about a longitudinal axis of the fuselage 102. Additionally, the sensors may also be centered along the axes of the fuselage 102. Accordingly, it should be appreciated that the sensor locations may be particularly selected based on a variety of factors, such as aircraft size, sensor size, power and communication systems, and the like.

Figure 3:
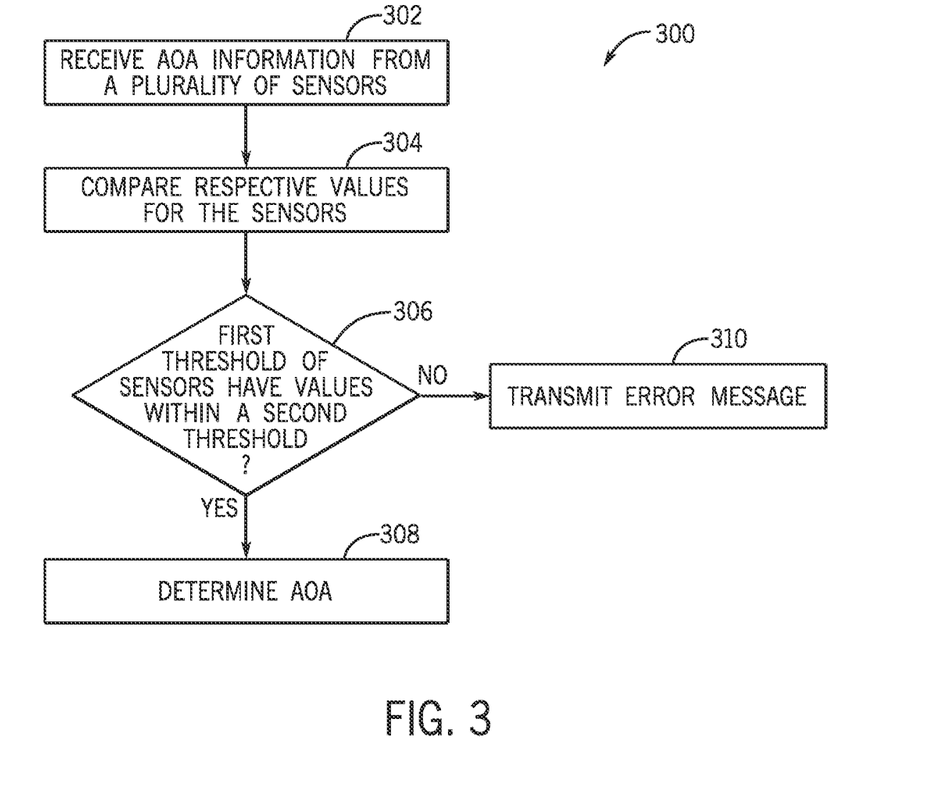
FIG. 3 is a flow chart of an embodiment of a method for determining the AOA, in accordance with embodiments of the present disclosure.

FIG. 3 is a flow chart of an embodiment of a method 300 for determining an AOA for an aircraft. It should be appreciated that this method, and other methods described herein, may include more or fewer steps. Furthermore, the steps may be performed in any order, or in parallel, unless otherwise explicitly stated. In various embodiments, the steps may be performed by a processor executing instructions stored on a memory. The processor and memory may be part of a control system that receives inputs, for example from a variety of sensors, and then analyzes the sensor data to provide information to an operator, such as an aircraft pilot.

In this example, AOA information is received from a plurality of sensors 302. For example, a reasonable number of sensors, such as 3 or 4 as described above, may be arranged along an aircraft. These sensors may be positioned at a distance away from one another to reduce a likelihood that damage to one sensor, such as from a bird strike, affects other sensors. The information from each of the sensors is compared 304. For example, the information may be compared to other sensors to determine whether the respective values are within a threshold (e.g., first threshold) of one another. The first threshold may correspond to a percentage difference between the sensors, a predetermined value away from a set number, and/or the like. For example, the information from a respective sensor may be compared individually against each of the other sensors. If a sensor has a value that exceeds the threshold, that sensor may be flagged or otherwise tagged. Further analysis against additional sensors may provide information whether the sensor is providing erroneous information, or whether a compared sensor provided the erroneous information. By way of example, if a first sensor is outside of the threshold with a second sensor, but within a threshold of both a third sensor and a fourth sensor, it may be likely that the second sensor is providing erroneous information. Additionally, It should be appreciated that, in various embodiments, a damaged sensor may provide no information at all.

In various embodiments, each of the sensors may be analyzed to determine whether one or more of the sensors is within the threshold range of the other sensors 306. If a threshold number of sensors (e.g., second threshold) are providing information within the first threshold, then the AOA is determined 308. That is, receiving corresponding or corroborating information from a threshold number of sensors may provide sufficient confidence of the received value, and as a result, information utilized to calculate the AOA may be transmitted to an operator (e.g., a pilot), to a control system that may make adjustments to operation of the aircraft, to a monitor evaluating information from the aircraft (e.g., air traffic control), and/or the like. If a threshold number is not identified, an error message may be transmitted 310. The error message may be provided to the pilot, to the system, to the monitor, or any combination thereof. For example, the pilot may receive information regarding the potentially erroneous information from the AOA sensors, along with instructions for utilizing alternative information to operate the aircraft. In this manner, the accuracy of the sensors may be evaluated while also providing at least one back up in the event a sensor is damaged. This overcomes problems with existing systems that require all components of the system to be within the first threshold and may disable certain systems if such correlation is not obtainable. By providing backup systems, as well as an improved evaluation procedure, systems and methods of the present disclosure reduce the likelihood of losing an operation system in the event of failure of a single component of the system.

Figure 4:
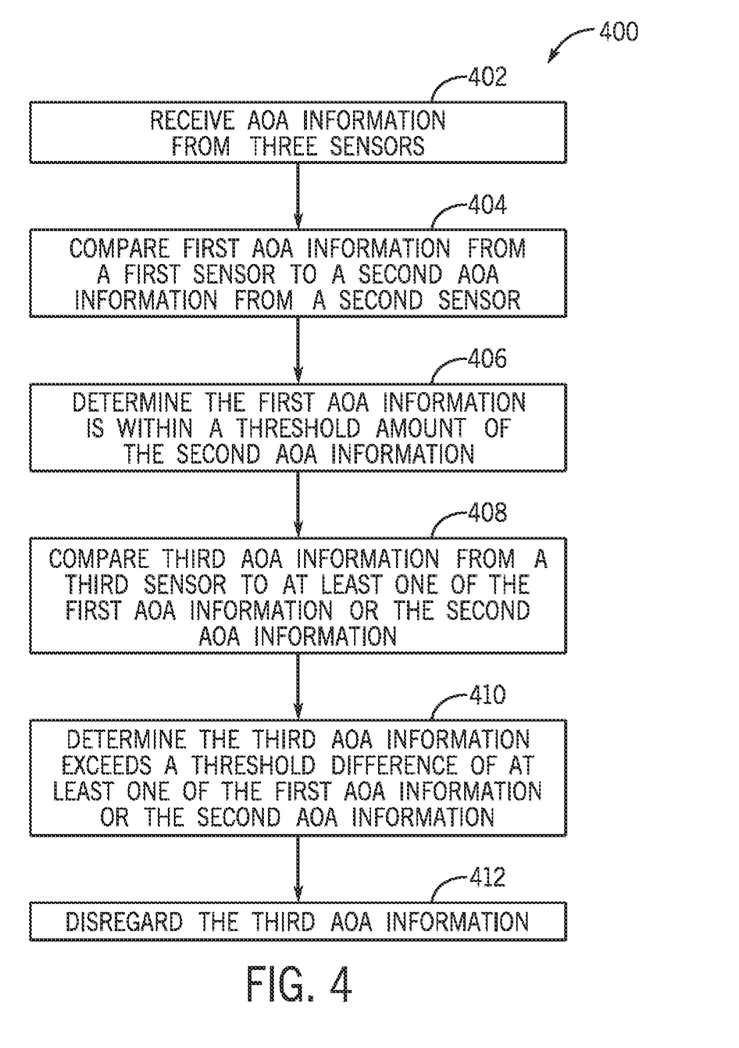
FIG. 4 is a flow chart of an embodiment of a method for evaluating sensor data, in accordance with embodiments of the present disclosure.

FIG. 4 is a flow chart for a method 400 for comparing AOA information from a group of sensors. In this example, three sensors are positioned on an aircraft to acquire AOA information. The information is received 402 and then information from two of the sensors is compared 404. In this example, information from a first sensor and a second sensor are compared. The comparison may determine whether a difference between the first sensor and the second sensor is within a threshold amount. As noted above, the amount may be particularly selected, may correspond to a percentage different, a certain value difference, or the like. If the difference is within the threshold, it may be determined with a sufficient level of confidence that the first and second sensors are providing accurate information 406. Third AOA information from a third sensor is then compared to at least one of the first AOA information or the second AOA information 408. Because the previous step may have determined that the information is accurate, the third AOA information may only be compared to one of the first AOA information or the second AOA information to reduce processing load. However, it should be appreciated that the third AOA information may be compared to both of the first and second AOA information. For example, in various embodiments, a difference between the third AOA information may exceed the threshold when compared to the first AOA information, but to not exceed the threshold when compared to the second AOA information. As a result, comparing the third AOA information against both may be useful for identifying whether the third information is providing erroneous data. Third AOA information that is determined to exceed the threshold difference 410 may be disregarded 412. As noted above, there may be one or more rules that evaluate the AOA information and having two of three sensors providing information that corresponds within the threshold may be deemed sufficient for providing AOA information for control of the aircraft. It should be appreciated that the first, second, and third designations may be dynamically permuted by the control system to identify which sensor's output is to be discarded.

Embodiments of the present disclosure are also directed toward using additional or alternative sensor systems, which may be utilized along with or in place of the previously described AOA sensors, to determine the orientation of the aircraft. It should be appreciated that while various embodiments in this disclosure include reference to aircrafts, that systems and methods may also be incorporated into determining the orientation of a variety of vehicles, such as ships, locomotives, motor vehicles, and the like. In this embodiment, multiple GPS (global positioning system) sensors may be utilized to reliably determine the orientation of a vehicle. As will be described below, the sensors and their associated circuitry are linked together through means such as coaxial cables or radio waves which have substantially constant transit times for their signals.

Figure 5:
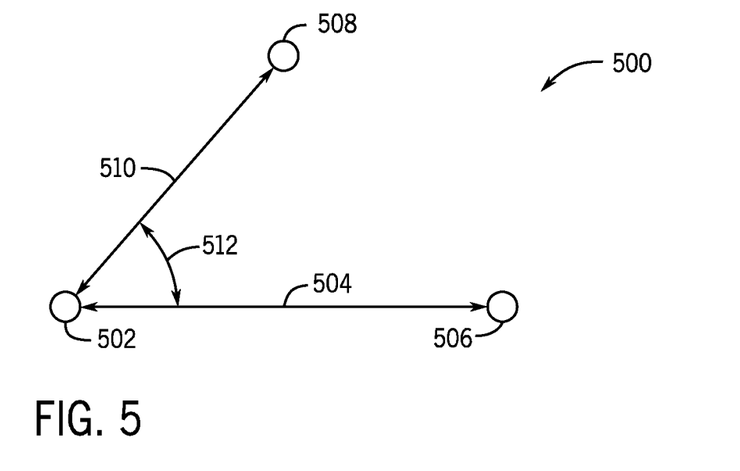
FIG. 5 is a schematic diagram of an embodiment of system for determining AOA using global positioning system (GPS) coordinates, in accordance with embodiments of the present disclosure.

Three or more GPS satellite signals are used for the position calculation, but for clarity with the present discussion, embodiments may be described with reference to a single satellite's signal and two GPS receivers. FIG. 5 is a schematic diagram illustrating an example environment 500 illustrating concepts of the present disclosure. A first receiver 502 is positioned a distance 504 away from a second receiver 506. By way of example only, the distance 504 may be approximately 30 meters. As shown, the receivers 502, 506 are positioned along a horizontal plane with respect to a satellite 508 that is vertically displaced from the receivers 502, 506. The satellite 508 is positioned at a second distance 510, which may be approximately 28,000,000 meters for this example. Furthermore, in this example, the satellite 508 arranged at an angle 512 with respect to the first receiver 502, which is approximately 45 degrees in this example. This distance is sufficient that the angle of the second receiver 506 is very close to 45 degrees, and its distance from the satellite is equal to the second distance 510 plus 30 meters times the cosine of 45 degrees, or the second distance 510+21.213 meters. The receivers measure the time at which the signal is received. The first receiver 502 receives the signal a number of seconds after the satellite 508 transmits it, defined by Equation 1:

$$D/c+E \tag{Equation 1}$$

where D is the second distance 510, c is the speed of light, and E is a time difference caused by the reduced speed of the signal in the atmosphere and varies by an amount that limits the accuracy of a single GPS receiver. Because the two receivers 502, 506 are close to each other compared to the thickness of the atmosphere, E is essentially the same for both, so the second receiver receives the signal 21.213/c seconds after the first, or 70.760 nanoseconds later. If the second sensor moves upward by 0.0283 meters, the path difference between the two sensors is reduced by 0.0283 times the cosine of 45 degrees, or 0.02 meters, a time reduction of 67 picoseconds. This may be at the minimum resolution of the system, and as a result may correspond to a measurability limit. However, it should be appreciated that this limit may only be present for particular hardware configurations and may change. This change represents a tilt of the line connecting the sensors of 0.05 degrees. The system works despite the vehicle speed because it already deals with satellites moving approximately 13,000 kilometers an hour, and the earth's rotation relative to a fixed direction of approximately 1,200 kilometers per hour at mid-latitudes, so the difference in speed due to the vehicle's motion makes relatively little difference to it.

Figure 6A:
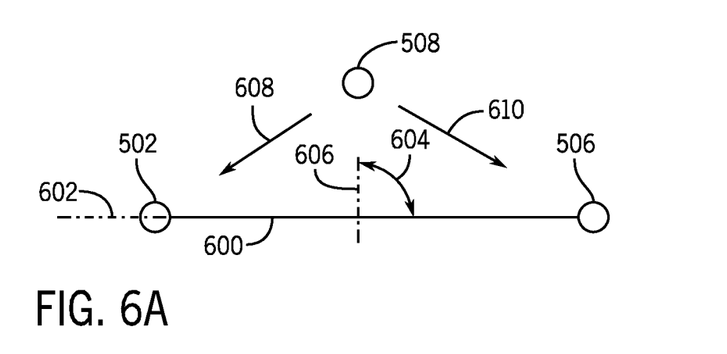
FIG. 6A is a schematic diagram of an embodiment of system for determining AOA using GPS coordinates, in accordance with embodiments of the present disclosure.
Figure 6B:
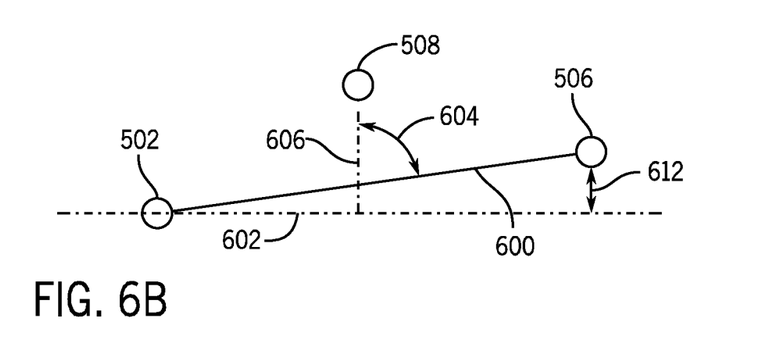
FIG. 6B is a schematic diagram of an embodiment of a system for determining AOA using GPS coordinates, in accordance with embodiments of the present disclosure.

FIGS. 6A and 6B are schematic diagrams illustrating the use of GPS receivers for determining an AOA for a vehicle, such as an aircraft. As shown in FIG. 6A, the two sensors 502, 506 are arranged along a fixed axis 600, which may correspond to aircraft wings, a body of a train car, a ship hull, or the like. It should be appreciated that the fixed axis 600 may represent a physical component that may be considered rigid, but still provides for flexibility in accordance with its material properties. In this embodiment, the fixed axis 600 is illustrated as level, which may correspond to a zero angle between the fixed axis 600 and a reference axis 602. Furthermore, the level may also correspond to a 90 degree angle 604 between a vertical axis 606 and the fixed axis 600. FIG. 6A may be considered at a time t=0. In this case, signals 608, 610 transmitted from the satellite 508 to the receivers 502, 506 may be received known times, as described above. That is, a time difference between the receipt at the first receiver 502 and the second receiver 506 may be known.

FIG. 6B illustrates a shift along the fixed axis 600 where the angle 604 has changed with compared to the embodiment shown in FIG. 6A, for example at a time t=x. Accordingly, a distance between the satellite 508 and the second receiver 506 has changed, as noted above. Therefore, the known receipt times will also change, thereby enabling a determination of the angle 604, which may be correlated to a change in vertical position 612 of the second receiver 506. In this manner, the AOA may be determined based on the receivers along the fixed axis 600. As previously noted, flexibility of the fixed axis 600, with respect to material properties, may also be factored into the calculation.

Figure 7:
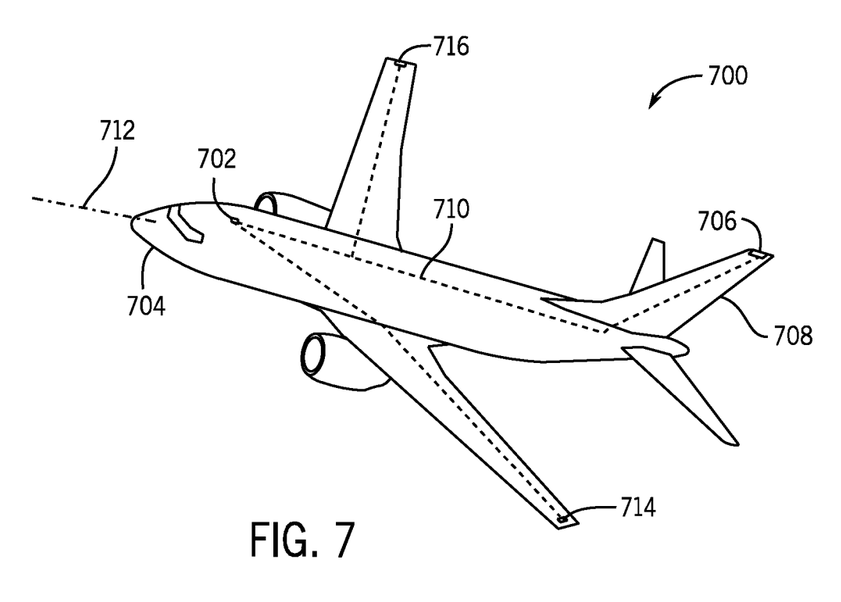
FIG. 7 is a schematic diagram of an embodiment of an aircraft including GPS antennas, in accordance with embodiments of the present disclosure.

FIG. 7 is a schematic diagram of an embodiment of an aircraft 700 including sensors that may be utilized to determine the AOA of the aircraft 700. As noted above, while the embodiments may be described with reference to the aircraft 700, the systems and methods described herein are not limited to use with aircrafts and may be utilized to determine orientation for a variety of different vehicles.

The illustrated aircraft 700 has a first GPS antenna 702 installed at a front 704 and second GPS antenna 706 installed at a rear 708. In various embodiments, the antenna 702, 706 are positioned to reduce air drag, provide resistance to contamination, minimize obstructions, and the like. The illustrated antenna 702, 706 are shown as being communicatively coupled together via an electrical connection 710 (illustrated by the dashed line). In various embodiments, coupling the components together enables a high level of accuracy regarding the data received with respect to signal transmission of associated GPS satellites. In various embodiments, the connection 710 is any fixed and stable-time-delay connector, such as a fiber optic signal, coaxial cable, waveguide, or through-the-air electromagnetic signal. The signal from these two sensors 702, 706, when combined with the signal from an independent air speed sensor and a vertical velocity measurement, is used to determine the angle-of-attack. As will be appreciated, this grouping of components may be less likely than existing sensors to fail due to such things as bird strikes, accidental contact during maintenance, and the like.

The AOA is the angle between two vectors. A first vector is characteristic of the aircraft, such as an axis 712 defined by the centerline of the fuselage or by the shape of the wing, which may correspond to the fixed axis 600 described with respect to FIGS. 6A and 6B. The direction of this vector relative to the horizontal direction is determined by the orientation of the aircraft 700. The other vector is the direction the aircraft is moving through the surrounding air. The horizontal component of the wind speed can be a significant fraction of the air speed, whereas the vertical velocity of the air is usually a small fraction of the airspeed, except in unusual cases such as aircraft flying in the eye of a hurricane or low speed aircraft flying in canyons. It should be noted that the vertical velocity of the air is not the same thing as the vertical gradient of the air velocity, which refers to the variation of horizontal wind velocity as a function of altitude. The second vector, under the normal conditions described above, is defined by an angle relative to the horizontal equal to the arcsine of the vertical velocity divided by the airspeed. The AOA is then the angle between these two vectors.

Embodiments of the present disclosure may use several options to determine the AOA. The first vector can alternatively be determined using the differential GPS system described above or by using the aircraft's gyroscope. Initial gyroscope accuracies of 0.1 degrees can be achieved, but drifts as high as 2 degrees an hour are not uncommon. Such gyroscopes have a mean time to failure of typically 10,000 hours, or once per 7 months in an aircraft flown 10 hours a day. Multiple gyroscopes can be used to achieve acceptable availability. An error of 10 degrees at the end of a 5-hour flight would be unacceptable, since the maximum AOA before stalling occurs is typically 15 degrees. The second vector can alternatively be determined using the normal output of one of the GPS sensors or by using the aircraft's altimeter. Although the GPS receiver yields a more accurate altitude, either approach is suitable for determining vertical aircraft velocity.

In embodiments, a first roll sensor 714 is added to allow the system to determine the roll of the aircraft. The further addition of a second roll sensor 716 enables a more precise determination of roll, and also permits continuous monitoring of wing flexure. This is useful for detecting extreme turbulence events that warrant inspection of the airframe for cracks, and provide immediate location information so that following aircraft can be warned. An alternative approach may also include using the aircraft's gyroscope to determine roll and strain gauges to measure wing deflection.

As noted above, systems and methods of the present disclosure may be utilized with a variety of different vehicles. For application to ships, two sensors, one on the starboard side and one or the port side, are used as inputs to the ship's stabilization system as an alternative to, or backup for, a gyrocompass. For application to railroad locomotives, or any other type of rail vehicle, two linked GPS sensors mounted on the left and right sides of the top of the vehicle are used to detect anomalous side-to-side tilting of the vehicle, thereby detecting places where the trackbed needs maintenance. In this case, the GPS system also records or transmits the location where the event occurred so that corrective measures can be taken at that location. A third or fourth GPS receiver, mounted on an adjacent coupled rail car, and linked to the receivers on the first rail vehicle, provide even more information by allowing differences in side-to-side motion and in relative vertical position, in addition to tilt, to be detected with high precision. For application to road vehicles, a vehicle being used for road inspections may use two to four GPS linked GPS receivers to detect out-of-plane motions signifying potholes, misaligned slabs, or sunken roadways at such places as bridge entrances and exits. The location of these events is recorded or transmitted so that needed maintenance can be performed at locations with the highest priority.

Figure 8:
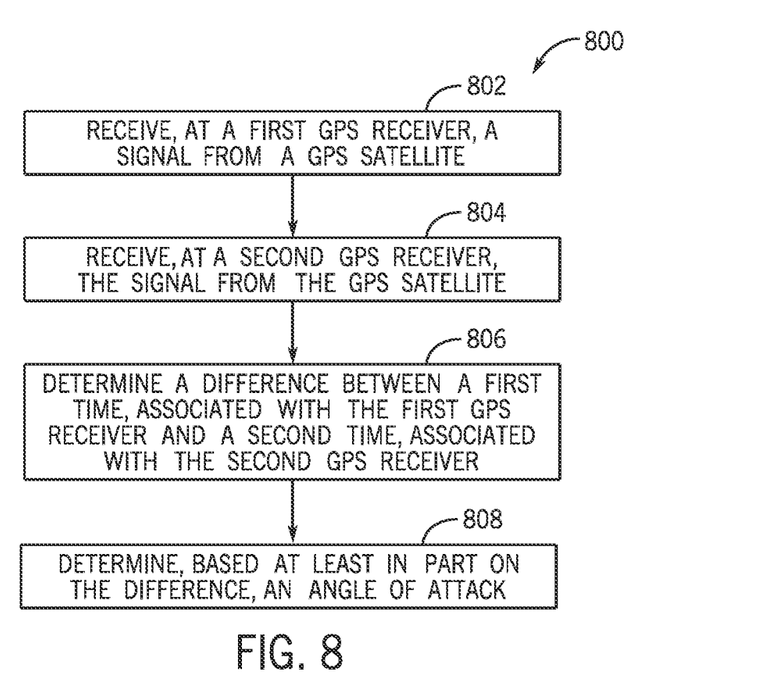
FIG. 8 is a flow chart of an embodiment of a method for determining the AOA, in accordance with embodiments of the present disclosure.

FIG. 8 is a flow chart of an embodiment of a method 800 for determining an AOA. In this example, a first GPS receiver receives a signal from a GPS satellite 802. The first GPS receiver may be mounted on a vehicle, such as a plane, and may be arranged along an axis of the vehicle associated with a desired measurement. For example, in embodiments directed toward aircrafts, the axis may correspond to a longitudinal axis of the aircraft for a determination of the AOA. A second GPS receiver receives the signal from the GPS satellite 804. It should be appreciated that the signal may be the same signal transmitted to the first receiver or a different signal. As will be appreciated, the receivers may receive and record the signals at different times, which may correspond to their relative positions with respect to the GPS satellite. A difference between the times when each of the receivers obtains the signal may be determined 806. For example, in embodiments, a first difference may be expected due to relative positions of the receivers. However, in other embodiments, for example where one of the receivers has been shifted closer or farther away, a second difference may be recorded. This difference may then be utilized to calculate a vertical position of the receiver, relative to the other receiver, and may also be combined with other sensor information to calculate the AOA 808.

Accordingly, embodiments of the present disclosure may utilize GPS receivers to determine an orientation of various vehicles. In many of the cases disclosed herein, two or more GPS receivers mounted on a vehicle, known locations of the receivers on the vehicle, stable transit time communications among the receivers, and the ability to determine orientation information about the vehicle may be used in order to identify tilting of the vehicle, which may correspond to a variety of different parameters, depending on the vehicle. As used herein, "mounted on" includes "mounted in"; "stable transit time" includes "variable but known transit time"; "communications among the receivers" includes communications between the receivers and a separate circuit that permits the time differences between signals from GPS receivers to be determined or otherwise utilized; "vehicle" includes any machine capable of moving approximately in an intended direction; "coupled vehicle" means two vehicles with a controlled separation, and "roadbed" includes a railroad track, roadway, monorail, or similar vehicle support means. Any identified antenna, receiver, transmission means, electronic circuit, or sensor includes a plurality of such devices when needed to achieve the desired reliability and availability of the system or systems to which they pertain.

Figure 9:
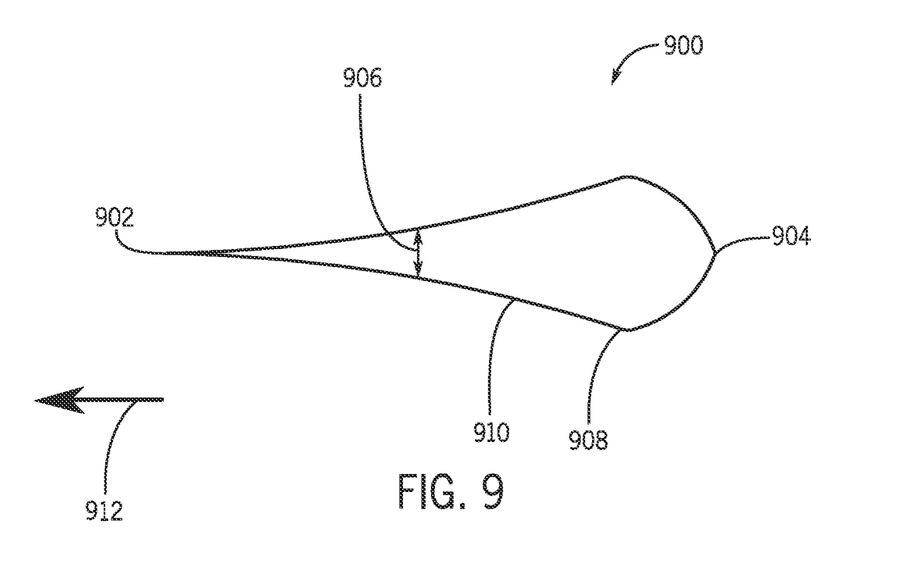
FIG. 9 is a top plan view of an embodiment of a sensor guard, in accordance with embodiments of the present disclosure.

As described herein, various embodiments incorporate one or more sensors associated with a vehicle, such as aircraft, in order to collect information for a determination associated with AOA, among other potential calculations. However, certain sensors may be damaged during operation, such as from striking birds or insects. This damage may render the sensors inoperable or lead to erroneous readings. Accordingly, embodiments of the present disclosure may also incorporate a sensor guard to protect one or more sensors. FIG. 9 is a top plan view of an embodiment of a sensor guard 900 (e.g., barrier), which may be incorporated into embodiments of the present disclosure. The illustrated sensor guard 900 includes a leading edge 902 and a trailing edge 904. As will be described below, the leading edge 902 may act as a blade to direct potentially damaging components, such as organic material that results from an impact with a bird, away from the sensors arranged downwind of the trailing edge 904.

The illustrated leading edge 902 is formed at a point and may be sharpened to facilitate separation and/or cutting of any organic material directed toward the sensor, which is arranged downwards and away from the sensor guard 900. The leading edge 902 may be sharped or otherwise provided with a cutting edge to facilitate the separation. As shown, a diameter 906 of the sensor guard 900 is variable in that is fans out toward the trailing edge 904, reaches an apex 908 having a maximum diameter, and then fans inwardly toward the trailing edge 904. As will be appreciated, a profile 910 of the sensor guard 900 may be particularly selected to reduce turbulence or wind resistance, thereby preventing erroneous readings at the downwind sensor as a result of the sensor guard 900. It should also be appreciated that, in various embodiments, one or more correction factors may be applied to measurements obtained by the sensors to correct for the presence of the sensor guard 900.

As previously described, the sensor guards 900 may be positioned up wind (e.g., upstream, axially in front of, etc.) the sensors. In other words, the sensor guard 900 is moving in the direction 912, represented by the arrow. The sensors may be arranged at a particularly selected distance downstream of the sensor guards 900, which may enable turbulence and the like to be corrected, while still providing protection. However, as noted above, correction factors may also be utilized and the sensors may be placed closer to the sensor guards 900. In this manner, the sensors may be protected from organic material.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for determining a vehicle orientation, comprising:
a plurality of first sensors, the plurality of first sensors mounted to a body of the vehicle and receiving orientation information, the plurality of first sensors being positioned at different locations on the body;
a second sensor receiving information indicative of a speed of the vehicle; and
a control system having a memory and a processor, the memory including instructions that, when executed by the processor, cause the control system to:
receive information indicative of the speed of the vehicle from the second sensor;
determine at least a threshold number of first sensors of the plurality of first sensors is providing orientation information; and
determine a property corresponding to the vehicle orientation, based at least in part on the orientation information from the threshold number of first sensors and the information indicative of the speed of the vehicle.

2. The system of claim 1, wherein the threshold number of first sensors is less than a total number of the plurality of first sensors.

3. The system of claim 1, wherein the property is at least one of angle-of-attack of the vehicle, a tilt of the vehicle, or a side-to-side motion of the vehicle.

4. The system of claim 1, wherein the vehicle is an aircraft and the property is angle-of-attack, the plurality of first sensors being positioned at a front of the aircraft about a circumference of the body, at least two first sensors of the plurality of sensors being arranged above a midline of the body.

5. The system of claim 4, wherein at least one first sensor of the plurality of sensors is positioned at least 35 degrees below the midline of the body.

6. The system of claim 1, wherein at least a portion of the plurality of first sensors comprise GPS antennas.

7. The system of claim 1, further comprising:
a sensor guard arranged axially forward of at least one first sensor of the plurality of first sensors, the sensor guard comprising a leading edge shaped to direct material away from the at least one first sensor.

8. The system of claim 7, wherein the instructions, when executed by the processor, further cause the control system to:
apply a correction factor, to the orientation information, the correction factor based at least in part on turbulence from the sensor guard.

9. A computer-implemented method, comprising:
receiving a plurality of orientation information from a plurality of sensors, wherein each sensor of the plurality of sensors provides respective orientation information;
comparing respective values of the plurality of orientation information to other respective values of the plurality of orientation information;
determining the respective values for the orientation information for at least a first threshold amount of sensors of the plurality of sensors is within a second threshold of the other respective values of the plurality of orientation information;
determining, based at least in part on the respective values within the second threshold, a property of a vehicle orientation.

10. The computer-implemented method of claim 9, further comprising:
determining at least one value for the orientation information exceeds the second threshold; and
transmitting a message identifying the sensor of the plurality of sensors associated with the orientation information exceeding the second threshold.

11. The computer-implemented method of claim 9, wherein the first threshold is at least half of the plurality of sensors.

12. The computer-implemented method of claim 9, wherein the first threshold is equal to the total number of sensors of the plurality of sensors minus one.

13. The computer-implemented method of claim 9, wherein the second threshold is based at least in part on a percentage or an absolute value.

14. The computer-implemented method of claim 9, wherein
each sensor of the plurality of sensors is an airflow direction sensor arranged on a body of an aircraft.

15. The computer-implemented method of claim 9, wherein each sensor of the plurality of sensors is positioned at a different circumferential position on a body of an aircraft.

16. A system, comprising:
 a first sensor, arranged along an axis of a vehicle body;
 a second sensor, arranged along the axis of the vehicle body, the second sensor being arranged at an opposite end of the vehicle body than the first sensor; and
 a connection between the first sensor and the second sensor, the connection having substantially constant transit times;
 wherein each of the first sensor and the second sensor receives a signal transmitted from an orbiting satellite, a respective receipt time of the signal being indicative of respective positions for each of the first and second sensors with respect to a neutral position.

17. The system of claim 16, wherein a change in orientation of the vehicle body is determined, at least in part, on at least one of the first sensor position or the second sensor position.

18. The system of claim 16, wherein each of the first sensor and the second sensor are global positioning system (GPS) receivers.

19. The system of claim 16, wherein the connection comprises at least one of a fiber optic cable, a coaxial cable, a waveguide, or an electromagnetic signal.

20. The system of claim 16, further comprising:
 a third sensor, arranged along a second axis of the vehicle body, the second axis being arranged at an angle with respect to the axis; and
 a fourth sensor, arranged along the second axis, the fourth sensor being arranged at an opposite side of the vehicle body than the third sensor;
 wherein each of the third sensor and the fourth sensor receives the signal transmitted from the orbiting satellite, the respective receipt time of the signal being indicative of respective positions for each of the third and fourth sensors with respect to a second neutral position.

* * * * *